March 30, 1943.  G. H. BROWN ET AL  2,314,863
SAFETY APPLIANCE FOR ELECTRICALLY HEATED APPARATUS
Filed Feb. 27, 1939   2 Sheets-Sheet 1
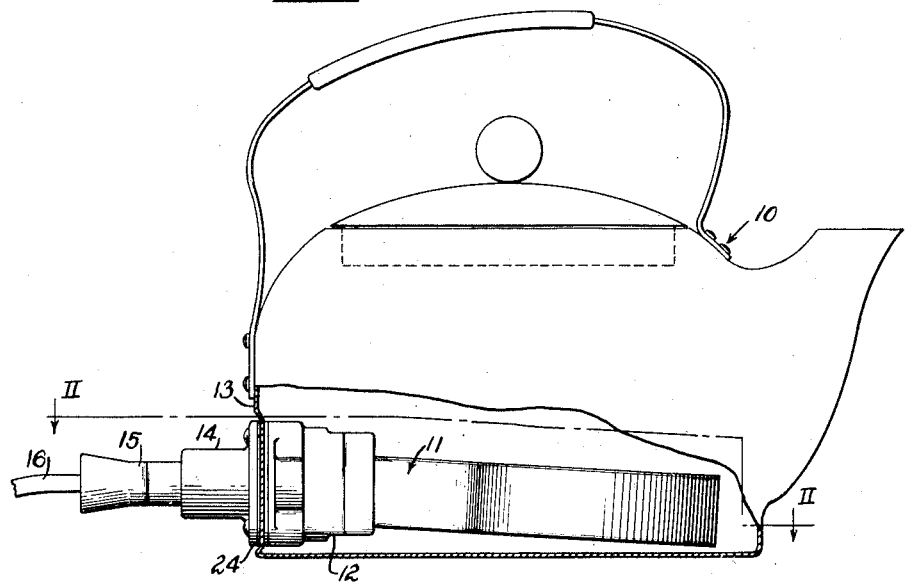
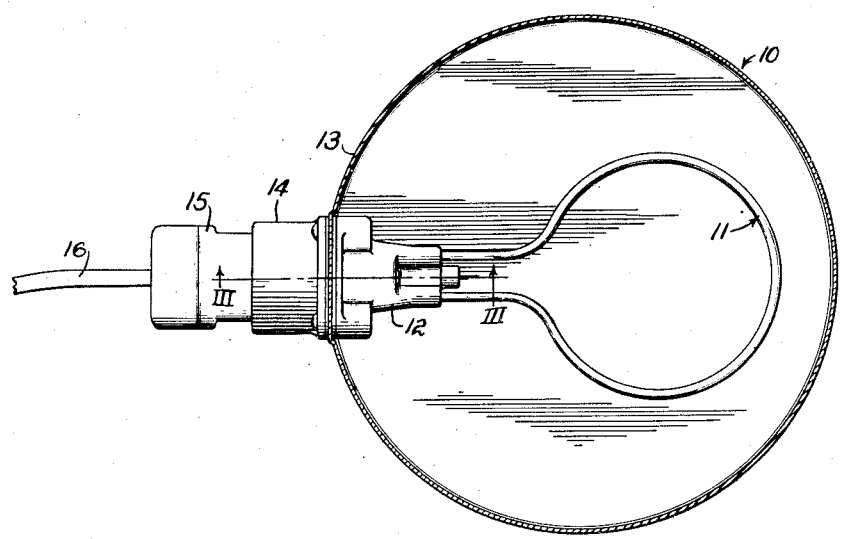
Inventors
Gordon H. Brown
Alfred E. Lanigan

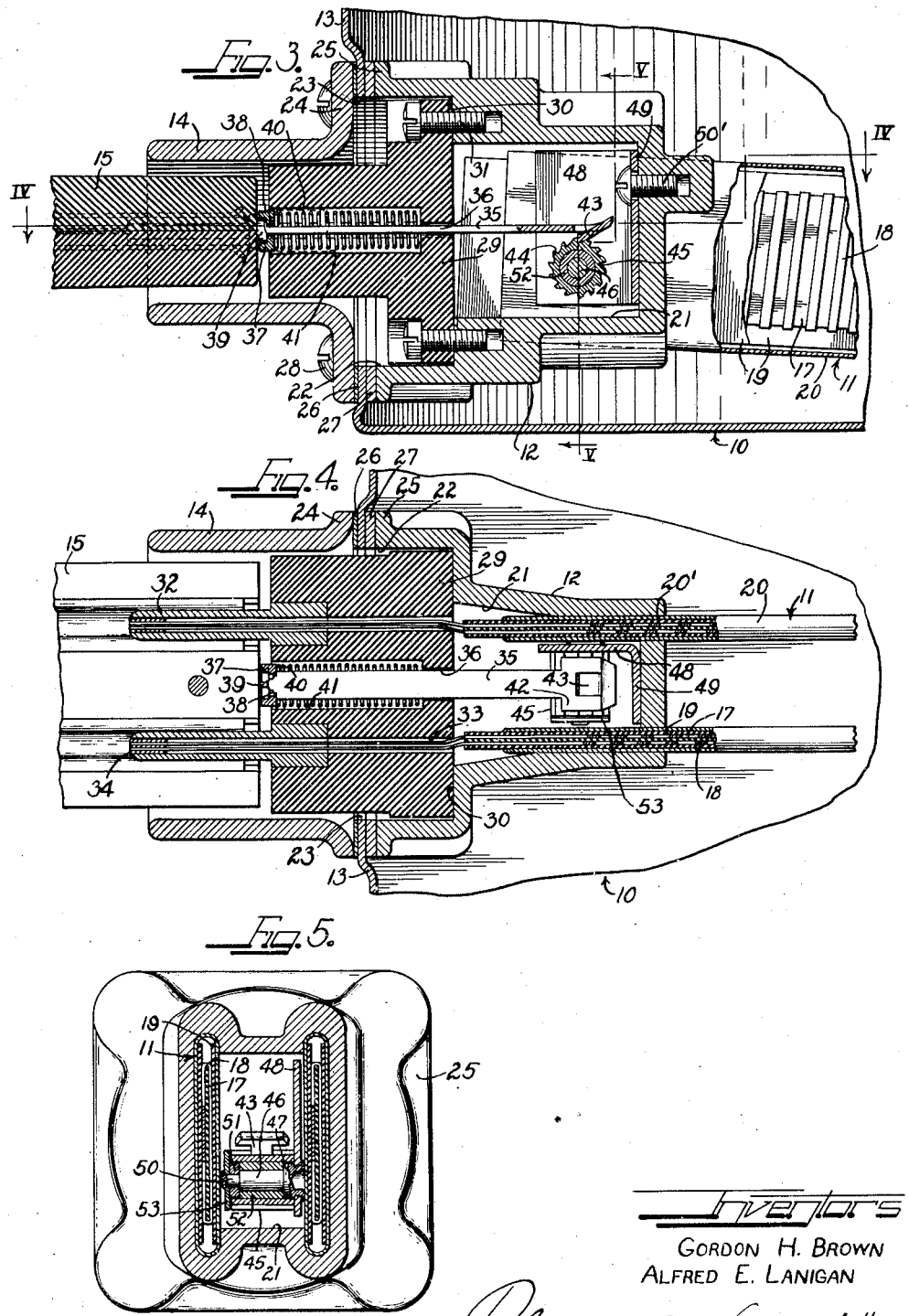

Patented Mar. 30, 1943

2,314,863

UNITED STATES PATENT OFFICE 2,314,863

SAFETY APPLIANCE FOR ELECTRICALLY HEATED APPARATUS

Gordon H. Brown and Alfred E. Lanigan, Detroit, Mich., assignors to Electromaster, Inc., Detroit, Mich., a corporation of Michigan Application February 27, 1939, Serial No. 258,758

2 Claims. (Cl. 200—142)

The present invention relates in general to safety appliances or devices of the type wherein means are provided for automatically interrupting an electrical circuit upon the occurrence of abnormal operating temperatures, and is particularly concerned with such devices as may be utilized for protecting electrically heated cooking and heating apparatus, such as electric teakettles, percolators, and the like.

The invention as used with such apparatus contemplates an arrangement in which the electrical connections will be maintained so long as the apparatus contains a liquid, but will immediately operate to automatically disconnect the electrical connection in the event that the liquid evaporates to such an extent as to subject the apparatus to possible damage by becoming overheated.

It is a further object of the invention to provide an improved safety appliance which is latched against operation at normal temperatures, but which will be unlatched for operation at abnormal temperatures, and which includes a novel and improved resetting mechanism for the latch.

It is a still further object of the herein described invention to provide improvements in the structure disclosed in the copending application of Albert E. Lanigan, Serial No. 237,848, of which the present application forms a continuation in part.

While the invention will be described in connection with its use for protecting heating and cooking apparatus, it will be apparent to those skilled in the art that the novel construction embodied therein may with equal facility be utilized in connection with other devices and apparatus.

Other objects and features of the invention will more fully appear from the following detailed description taken in connection with the accompanying drawings which illustrate a single embodiment thereof, and in which:

Figure 1 is a view in elevation of electrical apparatus, in this instance an electrically heated teakettle, a portion of the side wall thereof being cut away to disclose the manner in which the present invention may be embodied therein;

Figure 2 is a transverse sectional view of the teakettle showing the association of the present invention therewith; the section being taken substantially on line II—II of Figure 1;

Figure 3 is an enlarged fragmentary view including a longitudinal section through the safety appliance constituting the present invention, as taken substantially on line III—III of Figure 2;

Figure 4 is an enlarged fragmentary view of the same, including a horizontal section through the safety appliance, taken substantially on line IV—IV of Figure 3; and Figure 5 is a transverse sectional view through the latching mechanism showing the cooperative relationship of its parts, taken substantially on line V—V of Figure 3.

As shown on the drawings:

Referring to Figure 1, the invention is shown as being applied to electrically heated apparatus, in this instance a teakettle, as generally indicated at 10.

As shown, there is supported adjacent the bottom of the teakettle a heating element 11 of general split-ring construction, the ends of the heating element assembly being supported in a base or bracket member 12 secured to the wall 13 of the teakettle. Associated with the supporting bracket 12 and disposed outside of the teakettle wall is a socket 14 arranged to receive one end of an electric plug connector 15 by means of which electrical connection through a cord 16 may be established between the heating element and a suitable source of electric current.

As more specifically disclosed in Figures 3, 4, and 5, the heating element assembly comprises an insulating core 17 of mica or other suitable material upon which is wound a resistance wire or strip 18 with its turns in spaced apart relation. The core with the resistance element wound thereon produces a flat construction which is laterally insulated by strips of mica or other suitable material 19—19, the whole being assembled within a surrounding metallic sheath 20 which may be of soft copper or other suitable material.

The sheath is laterally bent to form a split ring, the ends of this ring being supported in the bracket member 12, openings 20'—20' being provided for the passage of the sheath ends into the interior of the bracket which is of hollow construction.

The bracket 12 is of substantially rectangular shape and may be constructed of any suitable material, such as aluminum. Interiorly, the bracket 12 is formed to provide a chamber 21 adjacent its closed end, and an enlarged chamber portion 22 adjacent its open end, these chambers being in communication with each other and the ends of the heating element assembly being disposed within the chamber 21 of the bracket.

The teakettle wall 13 is provided with an opening 23, and the bracket 12 and sleeve 14 are disposed in axially aligned relation and secured to the wall around the opening 23 by means of suitable mounting flanges 24 and 25 respectively formed on the adjacently disposed ends of the sleeve and bracket. These mounting flanges may be secured against suitable gaskets 26 and 27 and held in position by screws 28 passing through the corners of the flange 24 and being threaded into thickened corner portions of the flange 25.

Seated within the chamber 22 is an insulating block 29 which is secured with its innermost end in abutment with a shoulder 30 at the junction of chambers 21 and 22 by means of screws 31 extending through a flange portion of the block and threadedly engaging the wall of the bracket 12. The block 29 projects through the opening 23 in the teakettle wall and has its outer end disposed outwardly of the wall within the sleeve 14.

A pair of bayonet contacts 32 are anchored in the insulating block 29 in spaced apart relation and project outwardly therefrom to the outer end of the sleeve 14. These contacts are of hollow construction and permit the ends of the resistance wire 18 to be carried through passageways 33 in the insulating block in alignment with the interior of the contacts 32, to enable securing of the ends of the heating element adjacent the outer ends of the contacts as by soldering, as indicated at 34.

A plunger 35 is mounted in the insulating block 29 between the contacts 32—32 for reciprocable movement. This plunger is formed from an elongate metallic strip and is of greater width than thickness, so that when it is disposed in a rectangular opening 36 in the insulating block, the plunger will be permitted to move in a lengthwise direction, but will be retained against rotative movement.

At its outermost end, the plunger has mounted thereon a cup-shaped member 37. The member 37 is provided in its bottom with a slot 38 to receive a T-shaped tongue 39 at the associated end of the plunger therethrough, this tongue being twistable to a position angularly disposed relative to the slot, whereby the member 37 is retained in position.

The member 37 forms an abutment for one end of a spring 40 which is disposed within a socket 41 in the block 29, this socket at its bottom being in communication with the passage 36.

The spring 40 acting against the member 37 acts to move the plunger to the left as viewed in Figures 3 and 4. This movement is limited by means of an enlarged head portion 42 at the opposite end of the plunger 35. The head 42 is provided with a downwardly struck portion 43 which forms in effect a tooth for engaging with one of the teeth 44 of a ratchet wheel 45.

As shown in Figures 3, 4, and 5, the ratchet wheel is mounted on a shaft or pivot 46 having one end enlarged as shown at 47 and arranged for riveting connection with a leg 48 of an L-shaped bracket having an angularly disposed leg 49 which may be secured to the closed end wall of the bracket 12 as by a suitable screw 50'.

The shaft 46 extends transversely across the chamber 21 and has its outermost end contracted to form a portion 50 upon which there is disposed a bearing washer 51, which cooperates with the enlarged portion 47 at the anchored end of the shaft to form spaced bearings for the ratchet wheel and defines a central chamber in which there may be disposed a fusible material as shown at 52, this material preferably being a metal which will melt at a temperature of between 200° F. and 300° F. The bearing washer 51 may be held in position opposing removal of the ratchet wheel from its support by means of an end washer 53 fitting on the contracted end 50 and held against removal by riveting the outer end of this portion over the washer.

It will be apparent that the fusible metal will normally secure the ratchet wheel against rotation at normal temperatures, but if an abnormal temperature is encountered, within the limits of the fusibility of the metal, then the metal will start to melt and permit the ratchet wheel to be rotated relative to the shaft.

The ratchet wheel forms one element of a latching mechanism and comprises a resetting latch in which the ratchet teeth are successively moved into latching position by the unlatching operation of the plunger 35. That is, when the plunger 35 is depressed, by insertion of the plug 15 into the sleeve 14 so that its contacts become connected with contacts 32—32, the toothforming portion 43 at the head end of the plunger will be moved over and engage one of the teeth 44 of the ratchet wheel.

If the appliance is at a temperature below the melting point of the fusible metal securing the ratchet wheel against rotation, the plunger will be retained in depressed latched position, as shown in Figures 3 and 4. As soon as abnormal temperature is encountered, due to an insufficient amount of liquid in the teakettle, heat will be conducted from the heating element to the fusible metal and cause it to melt sufficiently to release the ratchet wheel for rotation. Due to the action of spring 40, the plunger 35 will be moved outwardly, and in doing so will tend to rotate the ratchet wheel and bring the next tooth into latching position. This outward movement of the plunger acts to eject the connector plug 15 from the sleeve 14, disconnect the circuit to the appliance, and serve as a visual indicator that the appliance has become overheated.

Before reconnecting the appliance by insertion of the plug 15 into the sleeve 14, the appliance should be allowed to cool for a short period either naturally or by the addition of more liquid into the appliance. Cooling of the fusible metal acts to again secure the ratchet wheel against rotation, and the latching mechanism may again be reset by insertion of the connection plug, as previously explained.

From the foregoing description, it will be apparent that the present invention provides an improved safety appliance which is latched against operation at normal temperatures, but which will be unlatched for operation at abnormal temperatures to disconnect the electrical connection to the heating apparatus, and which includes a novel and improved resetting mechanism for the latch.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

We claim as our invention:

1. In a safety switch assembly for an electrically heated structure and having a retaining insulating block, switch prongs on the block extending from one face thereof to receive a connecting plug, conductors connected with said prongs, a projecting member extending through the block for reciprocable movements and a fuse control for retaining said projecting member in an inoperative position, the improvement which includes a spring disposed in said block and secured to said projecting member, said spring being constructed and arranged to have a load impressed thereon when said projecting member is retained in an inoperative position whereby the projecting member is moved outwardly of the face of the block from which the prongs extend when the fuse control is released and removable means on the projecting end of the projecting member for exposing the spring for removal and servicing when removed from the projecting member.

2. In a safety switch assembly for an electrically heated structure and having a retaining insulating block, switch prongs on the block extending from one face thereof to receive a connecting plug, conductors connected with said prongs, a projecting member extending through the block for reciprocable movements and a fuse control for retaining said projecting member in an inoperative position, the improvement which includes passage through said block for receiving said projecting member, a shoulder in said passage, a coiled compression spring disposed around the projecting end of the projecting member and having one end abutting said shoulder, an enlarged end piece constructed and arranged for removable attachment to the projecting end of the projecting means, said end piece with said shoulder confining said spring in compressed condition when the fuse control retains the projecting member in an inoperative position.

GORDON H. BROWN.
ALFRED E. LANIGAN.